US012096413B2

(12) United States Patent
Wang et al.

(10) Patent No.: US 12,096,413 B2
(45) Date of Patent: Sep. 17, 2024

(54) FORWARD COMPATIBLE NEW RADIO SIDELINK SLOT FORMAT SIGNALLING

(71) Applicant: AT&T Intellectual Property I, L.P., Atlanta, GA (US)

(72) Inventors: Xiaoyi Wang, Austin, TX (US); Salam Akoum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 11 days.

(21) Appl. No.: 18/045,661

(22) Filed: Oct. 11, 2022

(65) Prior Publication Data

US 2023/0116305 A1    Apr. 13, 2023

Related U.S. Application Data

(63) Continuation of application No. 17/089,466, filed on Nov. 4, 2020, now Pat. No. 11,503,598, which is a continuation of application No. 16/403,402, filed on May 3, 2019, now Pat. No. 10,873,944.

(51) Int. Cl.
| | |
|---|---|
| *H04W 72/04* | (2023.01) |
| *H04L 5/00* | (2006.01) |
| *H04W 72/0453* | (2023.01) |
| *H04W 76/10* | (2018.01) |
| *H04W 76/27* | (2018.01) |
| *H04W 4/40* | (2018.01) |
| *H04W 84/04* | (2009.01) |

(52) U.S. Cl.
CPC ....... *H04W 72/0453* (2013.01); *H04L 5/0007* (2013.01); *H04W 76/10* (2018.02); *H04W 4/40* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 9,788,330 B2 | 10/2017 | Guo et al. | |
| 2016/0373915 A1* | 12/2016 | Kim | H04W 76/14 |
| 2016/0381666 A1* | 12/2016 | Kim | H04L 5/0055 370/329 |

(Continued)

OTHER PUBLICATIONS

Notice of Allowance received for U.S. Appl. No. 16/403,402 dated Sep. 18, 2020, 27 pages.

(Continued)

*Primary Examiner* — Sai Aung
(74) *Attorney, Agent, or Firm* — Guntin & Gust, PLC; Dana B. LeMoine

(57) ABSTRACT

Various embodiments disclosed herein provide for facilitating updating a slot format used for establishing a radio sidelink. According to an embodiment, a system can receive a slot format over a sidelink, wherein the slot format comprises a first release parameter and a transmit period. The system can further facilitate determining whether the first release parameter matches a second release parameter stored in the memory. The system can further facilitate, in response to the determining indicating that the first release parameter matched the second release parameter, updating a resource map used to transmit data, resulting in an updated resource map. The system can further facilitate transmitting the slot format based on the transmit period.

20 Claims, 11 Drawing Sheets

(56) References Cited

U.S. PATENT DOCUMENTS

| | | | |
|---|---|---|---|
| 2017/0164381 A1* | 6/2017 | Kim | H04W 72/04 |
| 2017/0238260 A1* | 8/2017 | Kim | H04L 5/0094 |
| | | | 455/522 |
| 2017/0245313 A1* | 8/2017 | Kim | H04L 1/1671 |
| 2018/0139724 A1 | 5/2018 | Loehr et al. | |
| 2018/0338319 A1* | 11/2018 | Kim | H04W 72/23 |
| 2019/0037555 A1* | 1/2019 | Kim | H04W 72/23 |
| 2019/0098611 A1 | 3/2019 | Shimezawa et al. | |
| 2019/0104525 A1 | 4/2019 | Santhanam et al. | |
| 2019/0149365 A1 | 5/2019 | Chatterjee et al. | |
| 2019/0349904 A1 | 11/2019 | Kwak et al. | |
| 2019/0373647 A1 | 12/2019 | Rugeland et al. | |
| 2020/0187064 A1 | 6/2020 | Susitaival et al. | |
| 2020/0229270 A1 | 7/2020 | Chatterjee et al. | |
| 2020/0275417 A1 | 8/2020 | Takeda et al. | |
| 2020/0281009 A1 | 9/2020 | Lee et al. | |
| 2021/0029688 A1 | 1/2021 | Zhang et al. | |

OTHER PUBLICATIONS

Non Final Office Action received for U.S. Appl. No. 17/089,466 dated Mar. 21, 2022, 26 pages.

* cited by examiner

FORWARD COMPATIBLE NEW RADIO SIDELINK SLOT FORMAT SIGNALLING

RELATED APPLICATIONS

The subject patent application is a continuation of, and claims priority to each of, U.S. patent application Ser. No. 17/089,466, filed Nov. 4, 2020, and entitled "FORWARD COMPATIBLE NEW RADIO SIDELINK SLOT FORMAT SIGNALLING," which is a continuation of U.S. patent application Ser. No. 16/403,402 (now U.S. Pat. No. 10,873,944), filed May 3, 2019, and entitled "FORWARD COMPATIBLE NEW RADIO SIDELINK SLOT FORMAT SIGNALLING," the entireties of which priority applications are hereby incorporated by reference herein.

TECHNICAL FIELD

This disclosure relates generally to a wireless communication system in general, and to a fifth generation (5G) wireless communication systems that utilizes a new radio (NR) sidelink for device to device communication. More specifically, facilitating updating of slot format used for establishing the NR sidelink.

BACKGROUND

5th generation (5G) wireless systems represent a next major phase of mobile telecommunications standards, also called new radio (NR) access, beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. Furthermore, release 12 introduced LTE sidelink, a device to device direct communication. Release 14 introduced an additional communication mode that was specifically designed for vehicle to vehicle (V2V) and vehicle to everything (V2X), known as NR sidelink. In the new mode, vehicles autonomously select the radio resources for their V2V communication. In this mode, V2V and V2X communication can occur without cellular coverage. This communication mode includes a distributed scheduling scheme that allows vehicles to select their radio resources (e.g., group of OFDM symbols and group of slots) for the NR sidelink.

The above-described background relating to facilitating updating slot format used for the NR sidelink is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
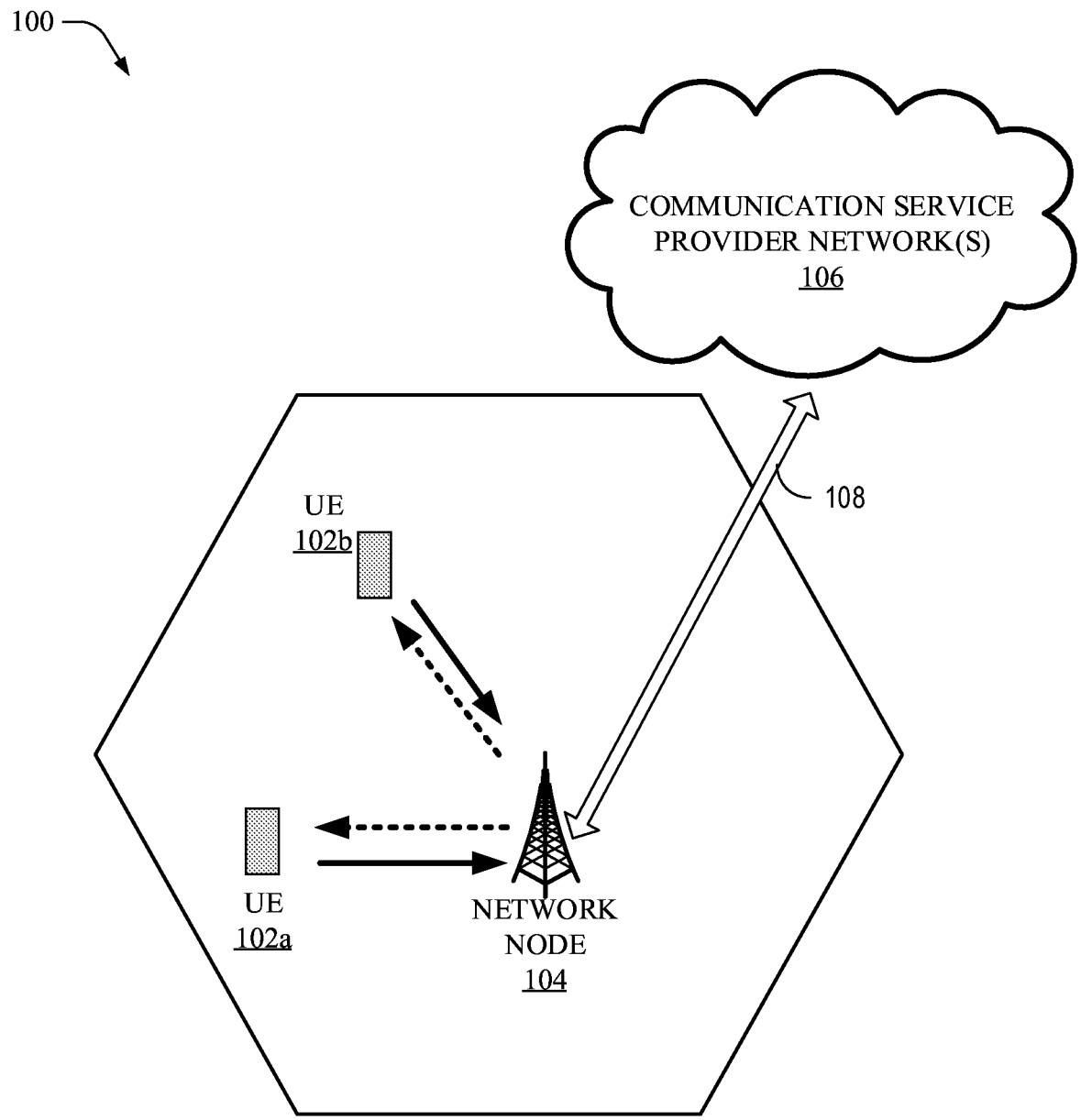
FIG. 1 illustrates an example wireless communication system in which a network node device (e.g., network node) and user equipment (UE) can implement various aspects and embodiments of the subject disclosure

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect." or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate updating of slot format that is used for establishing the NR sidelink. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate updating of a slot format that is used for establishing the NR sidelink. Facilitating updating of slot format used for establishing the NR sidelink can be implemented in connection with any type of device with a connection to the communications network (e.g., a mobile handset, a computer, a handheld device, etc.), any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. In some embodiments, UE can refer to a vehicle, a pedestrian, a mobile handset or any device that communicates with or without a network node. Examples of UE are a target device, a device to device (D2D) UE, a machine type UE or a UE capable of machine to machine (M2M) communication, a vehicle to vehicle (V2V) UE, a vehicle to everything (V2X) UE, a PDA, a tablet, mobile terminals, a smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio or network node is used. It can refer to any type of network node that serves UE connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

Wireless local area networks (WLANs) have long been deployed in unlicensed spectrum bands. The IEEE 802.11 communications standard is an example of a communications system operating in these bands. A popular implementation thereof, for example, is Wi-Fi. Numerous versions of the Wi-Fi_33 standard have been developed and deployed over the years such as 802.11a/b/g/n/ac/ax. One characteristic of this evolution is the ever-increasing bandwidth these communications standards can offer. For example, IEEE 802.11a started out with 20 MHz bandwidth whereby the latest generation, Wi-Fi_33 6 or 802.11ax, can access up to 160 MHz. The standards associated with Wi-Fi_33 (e.g., all versions) define how devices can transmit using unlicensed spectrum. A device operating using Wi-Fi_33, first listens on the portion of the subband (e.g., a subbands of 20 MHz) until there is no traffic before transmitting using that subband (e.g., also referred to as "sensing" or "scanning"). The sensing before transmitting applies to transmission on both uplink and downlink. Sensing is a method for checking for energy on a given subband during a time-slot. In particular, an energy detection threshold is defined per said LBT subband and whether the medium is occupied or idle is determined per LBT subband based on whether the measurement results in a value larger or smaller than said detection threshold. If for a given subband, the threshold is exceeded, it is considered occupied or busy; otherwise, it is considered idle (e.g., available to transmit for a predefined timeframes/timeslot, for example, ten timeslots).

As the LTE technology is advancing the resources employed for establishing communication, transmitting data or addition of reference signals causes the resource block to be adjusted. For the first generation of communication devices, a set of resources were reserved and the set of resources were available for general use (e.g., communication of data, establishing communication, etc.). The network node device and/or central controller determined how the available resources would be employed. As the LTE technology advanced, the use of available resources may be controlled by the communication device for device to device communication. LTE Rel-14 introduced a new mode that allowed a communication device to establish a NR sidelink that did not need the assistance of the network. Thus, the communication devices determined how the available resources may be employed. This allowed communication devices to create a NR sidelink using the available resources. The problem occurs when a new generation of communication devices enters the communication network. The new generation of communication devices may use certain available resources for specific purposes, thereby making those available resources unavailable. In this situation, collision may occur between the older version communication devices communicating with new generation communication devices.

In some embodiments, when a new generation of communication devices are released, the network node device broadcasts a message comprising a slot format. The slot format comprises a release parameter (e.g., indication of communication device equipment versions and release information, technology version or release information, and/or any form of indication that the message is specifically targeted to older version and/or release communication devices), and updated available resources (e.g., subset of OFDM symbols, subset of slots, re-broadcast periodicity parameter). In some embodiments, the slot format may comprise an offset parameter. The offset parameter provides amount time the communication device will delay before re-transmitting the received slot format. In some embodiments, slot format may indicate that an entire slot or mini-slot may not be available for general use. In some embodiments, when the communication device receives the message comprising the slot format, the communication device checks to determine if the slot format is for the communication device. In some embodiments, the release parameter is compared against the release information of the communication device. If the release parameters match, then the communication device will update the resource block (e.g., slot map or resource map) that is used for transmission of data and communicating with other communication devices without the assistance of the network. If the parameters do not match, then the slot format is ignored. In some embodiments, a daisy chain scheme is implemented wherein the received slot format is rebroadcasted. In some embodiments, the communication device generates a broadcast message and transmits the message using the original resource map. In some embodiments, the updated resource map is employed to rebroadcast the slot format. Each communication device can be configured to rebroadcast the slot format, regardless of the parameter matching. In some embodiments, the message is rebroadcasted at a specified time based on the transmit periodicity provided in the slot format. In some embodiments, the network may plan for synchronized transmission, wherein all the communication devices would hold the transmission of slot format so that all the communication devices can transmit at the same time. In some embodiments, the communication device may delay transmission for the period of time indicated by the offset received in the slot format.

The advantage of using the method described herein, is that a legacy communication device will be able receive the new resource map so that the communication device does not collide with new generation devices. Also, the advantage of using a daisy chain to rebroadcast is that a communication device is able to receive the updated resource map information via the network node or other devices that are rebroadcasting the slot format. Thus, if the communication device misses the update, the communication device will get slot format even if the network is not available.

According an embodiment, a system can comprise a processor and a memory that stores executable instructions that, when executed by the processor, facilitate performance of operations comprising receiving a slot format over a sidelink, wherein the slot format comprises a first release parameter and a transmit period. The system can further facilitate determining whether the first release parameter matches a second release parameter stored in the memory. The system can further facilitate in response to the determining indicating that the first release parameter matched the second release parameter, updating a resource map used to transmit data, resulting in an updated resource map. The system can further facilitate transmitting the slot format based on the transmit period.

According to another embodiment, described herein is a method that can comprise receiving, by a system comprising a processor, a first message over a sidelink that comprises a slot format, wherein the slot format comprises a first release parameter, a group of orthogonal frequency division multiplexed symbols, a group of slots and a transmit period. The method can further comprise determining whether the first release parameter matches a second release parameter stored in memory. The method can further comprise in response to the determining indicating that the first release parameter matched the second release parameter, updating a resource map used to transmit data, resulting in an updated resource map. The method can further comprise generating a second message wherein the second message comprises the slot format.

According to yet another embodiment, a machine-readable storage medium can comprise executable instructions that, when executed by a processor, facilitate performance of operations, including receiving a slot format, wherein the slot format comprises a first release parameter, a group of orthogonal frequency division multiplexed symbols, a group of slots and a transmit period. The operations can further comprise determining whether the first release parameter matches a second release parameter stored in memory. The operations can further comprise, in response to the determining indicating that the first release parameter matched the second release parameter, updating a resource map based on the group of orthogonal frequency division multiplexed symbols and the group of slots, resulting in an updated resource map. The operations can further comprise generating a second message wherein the second message comprises the slot format.

These and other embodiments or implementations are described in more detail below with reference to the drawings.

FIG. 1 illustrates a non-limiting example of a wireless communication system 100 in accordance with various aspects and embodiments of the subject disclosure. In one or more embodiments, system 100 can comprise one or more user equipment UEs (e.g., 102a and 102b and referred to as 102). The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosure, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like.

However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHZ) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2A:
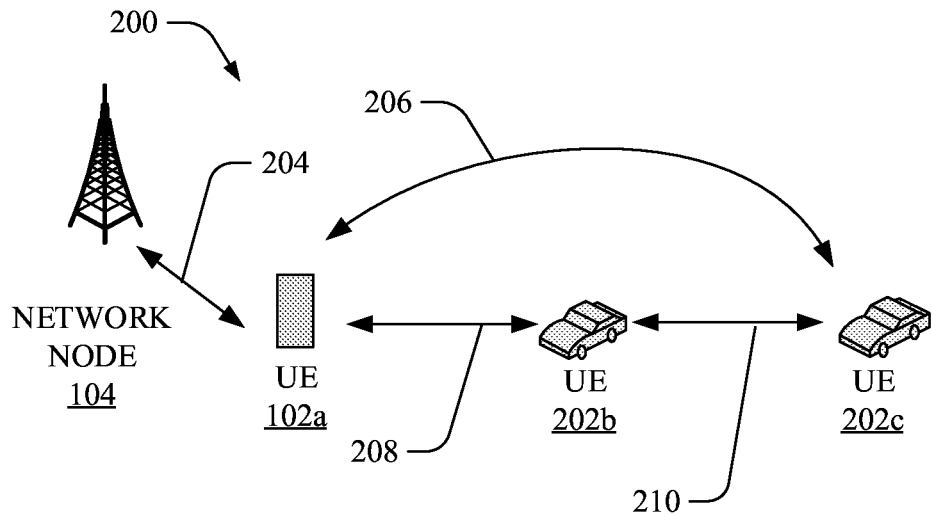
FIG. 2A illustrates an example communication system utilizing a direct sidelink in accordance with various aspects and embodiments described herein.

Referring now to FIG. 2A, illustrated is an example of a communication system utilizing direct sidelinks in accordance with various aspects and embodiments described herein. Repetitive description of like elements employed in other embodiments described herein is omitted for sake of brevity. In some embodiments, a system 200 comprises one or more UEs (e.g., 102a, 202b, and 202c) and the network node 104. In some embodiments, UE 102a is communicatively connected to the network node device 104 (e.g., via link 204) using standard communication, for example defined by LTE standards (Rel-8 through 16). In addition, in some embodiments, the UE 102a can be directly connected to UE 202b (e.g., via direct link 208) and directly connected to UE 202c (e.g., via direct link 206) and UE 202b can be directly connected to UE 202c (e.g., via direct link 210), using a sidelink. The sidelink is a new mode of communication (e.g., V2V), that allows one device to connect to another device. In some embodiments, the sidelinks 206, 208, and 210 are established using a group of OFDM symbols and group of slots, respectively. To establish, for example a V2V communication, the UE can use the available group of OFDM symbols and slots (e.g., a resource map) to establish communication with other UEs without assistance from the network, which may not always be available. The available groups of OFDM symbols and slots vary based on which release/version of LTE the UE is utilizing.

Figure 2B:
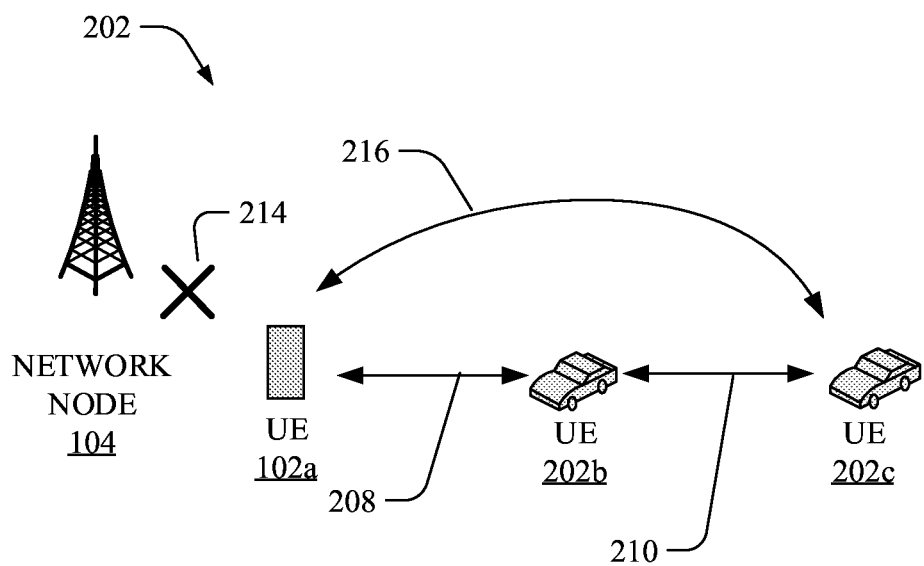
FIG. 2B illustrates an example communication system utilizing a direct sidelink in accordance with various aspects and embodiments described herein.

Referring now to FIG. 2B, illustrated is an example communication system utilizing direct sidelinks in accordance with various aspects and embodiments described herein. Repetitive description of like elements employed in other embodiments described herein is omitted for sake of brevity. In some embodiments, a system 202 comprises one or more UEs (e.g., 102a, 202b, and 202c) and the network node 104. In some embodiments, the network node 104 (e.g., network node device) is not connected (e.g., 214) due to unavailability. Regardless, in some embodiments, the UE 102a is directly connected to UE 202b (e.g., via direct link 208) and directly connected to UE 202c (e.g., via direct link 216) and UE 202b is directly connected to UE 202c (e.g., via direct link 210), using a NR sidelink. The NR sidelink is a new mode of communication (e.g., V2V) introduced in release 14 of LTE, which allows a device to connect to another device without the network. In some embodiments, the sidelinks 216, 208, and 210 are established using a group of OFDM symbols and a group of slots. To establish, for example a V2V communication, the UE can use the available group of OFDM symbols and slots (e.g., a resource map indicating the resource blocks that can be used by a UE for communication with other UEs) to establish communication with the other UEs without assistance from the network. The available group of OFDM symbols and slots can vary based on which release/version of LTE the UE is utilizing. In order to avoid collisions, each UE must use a same group of OFDM symbols and slots for V2V communication.

Figure 3:
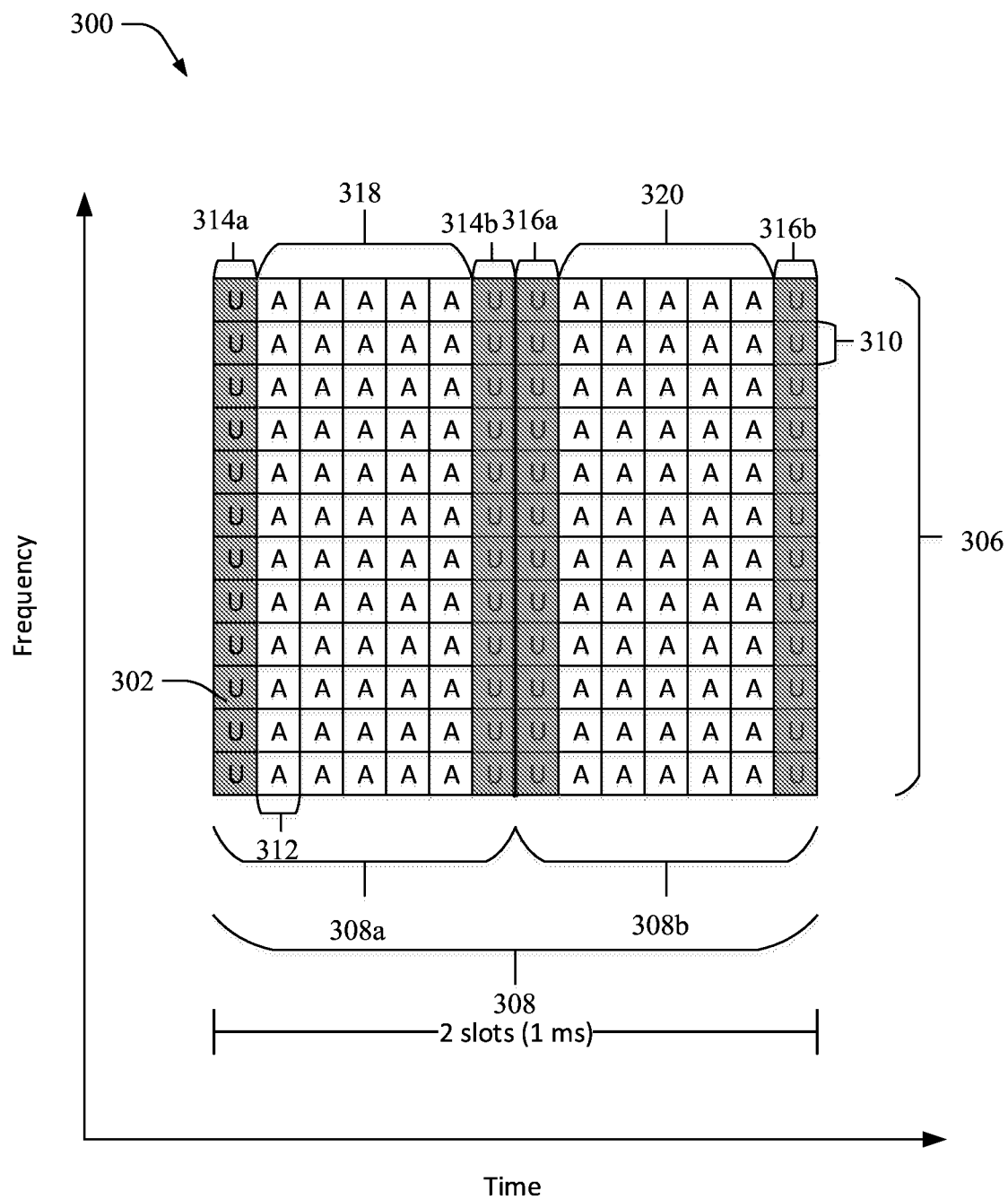
FIG. 3 illustrates an example resource block utilized to facilitate an NR sidelink in accordance with various aspects and embodiments described herein.

Referring now to FIG. 3, illustrated is an example resource block 300 utilized to facilitate an NR sidelink in accordance with various aspects and embodiments described herein. Repetitive description of like elements employed in other embodiments described herein is omitted for sake of brevity. In some embodiments, for example, the resource block 300 (e.g., used for LTE communication) is organized by time and frequency and can be used to establish communication, for example, between a communication device (e.g., UE 102a) and a network node (e.g., 104) and/or between communication devices (e.g., UE 102a, 202b, and 202c), as illustrated in FIG. 2A and FIG. 2B. The resource block 300 (also referred to as a slot map or a resource map), is organized by groups of resource elements 302 (each resource element 302 comprising e.g., an OFDM symbol x a subcarrier). In some embodiments, the resource block 300 is mapped as having 12 subcarriers 306 and one millisecond 308 (e.g., defined as two 0.5 millisecond (ms) slots 308a and 308b). Each row of resource elements in frequency domain defines a subcarrier 310 and each column of row elements in time domain defines an OFDM symbol 312. In some embodiments, the group of OFDM symbols (e.g., 7 OFDM symbols per slot 308a and 308b) and group of subcarriers (e.g., 12 subcarriers e.g., 306) are used for transmitting, for example, but not limited, one or more reference signals and/or communication data and or information to establish communication links.

In some embodiments, for example, resource block 300 illustrates a resource block that may be used for a technology release and/or technology version (e.g., a first generation of UE). As an example, the first generation of UEs, may employ the resource block 300 to establish communication between network nodes and communication devices. In some embodiments, resources defined by a subset of OFDM symbols 314a, 314b, 316a and 316b may be reserved by the operator making them unavailable for use by the communication device other than for specific uses designated by the operator (e.g., may not be available for communication of data between devices). In some embodiments, resources defined by a subset of OFDM symbols 318 and 320, may be used for various purposes, for example, but not limited to, establishing and/or communicating data between communication devices (e.g., creating a sidelink).

Figure 4:
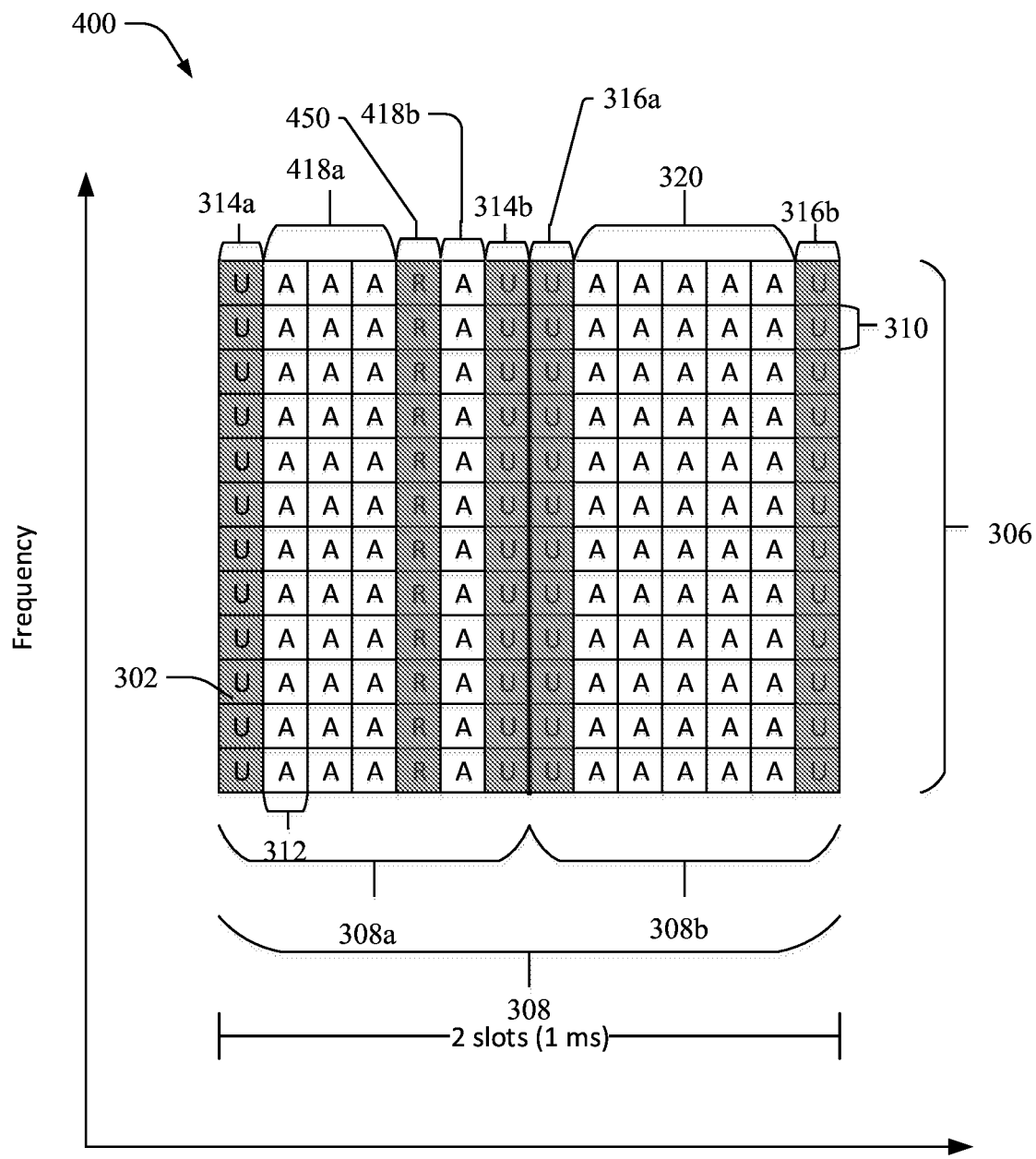
FIG. 4 illustrates an example resource block utilized to facilitate an NR sidelink in accordance with various aspects and embodiments described herein.

Referring now to FIG. 4, illustrated is an example resource block 400 utilized to facilitate an NR sidelink in accordance with various aspects and embodiments described herein. Repetitive description of like elements employed in other embodiments described herein is omitted for sake of brevity. In some embodiments, the resource block 400 is an updated version of the resource block 300 (FIG. 3). As the communication technology is updated, the resource block 300 is modified by reserving a subset of resource elements 302, a subset of OFDM symbols and/or slots to allow transmission of data for predefined purposes. In some embodiments, for example, resource block 400 illustrates a resource block that may be used for an updated technology release and/or technology version (e.g., a second generation of UE). In some embodiments, the second generation or updated resource block 400 comprises a subset of reserved resource elements (e.g., the group of OFDM symbols 450). The reserved resource elements are not available for general use (e.g., may not be used for various purposes, for example, but not limited to, establishing and/or communicating data between communication devices). In some embodiments, the group of OFDM symbols 320 remain available for general use and new subsets of OFDM symbols 418a and 418b are available for general use. This results in an updated resource map that modifies slot 308a of FIG. 3, so that the updated resource map has a reduced number of OFDM symbols that can be used for general use. It should be noted that any resource element (entire subcarrier or blocks defined by a subset of OFDM symbols by subset of subcarrier) may be reserved, making the reserved element not available for general use.

Figure 5:
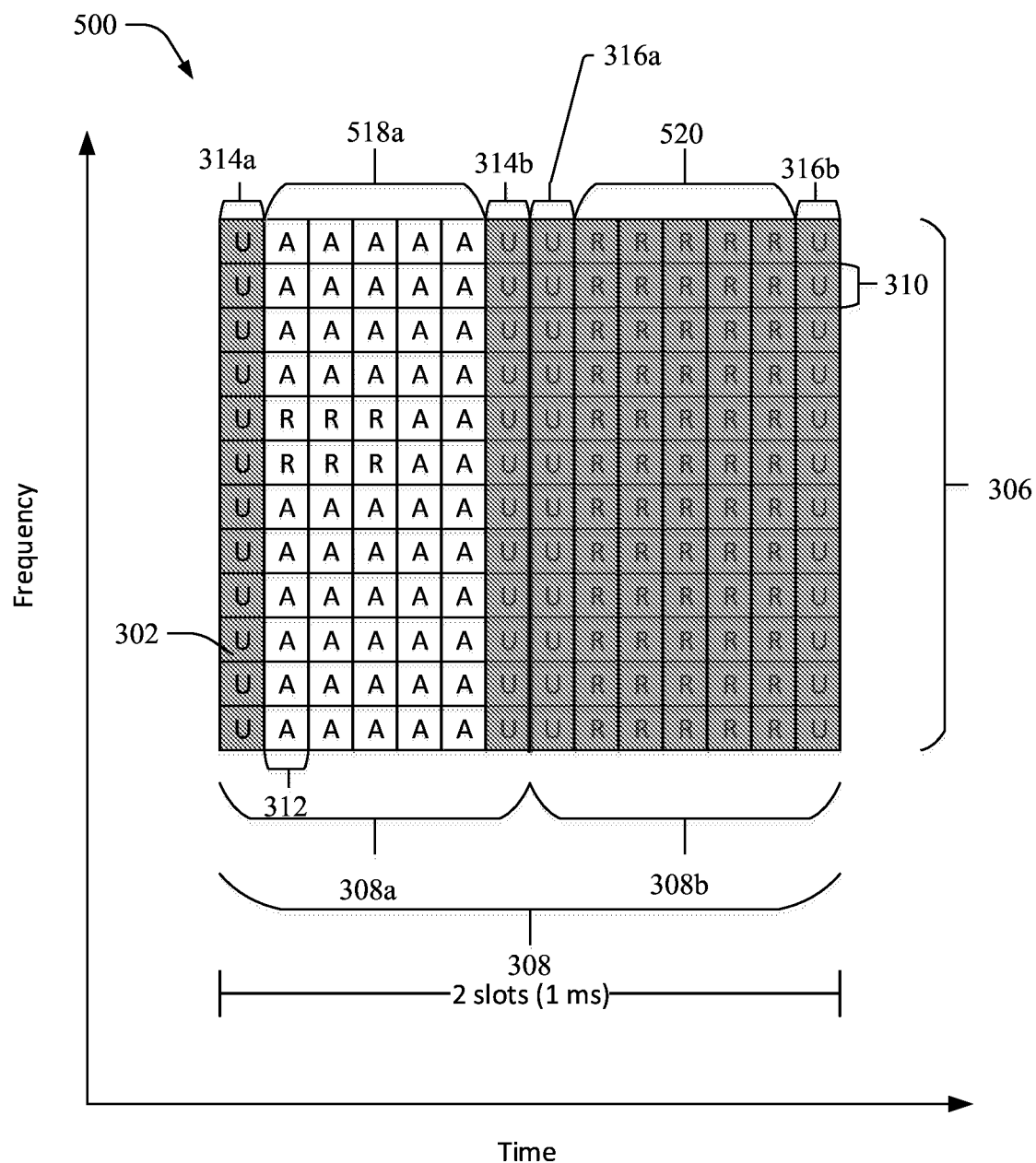
FIG. 5 illustrates an example resource block utilized to facilitate an NR sidelink in accordance with various aspects and embodiments described herein.

Referring now to FIG. 5, illustrated is an example of resource block 500 utilized to facilitate an NR sidelink in accordance with various aspects and embodiments described herein. Repetitive description of like elements employed in other embodiments described herein is omitted for sake of brevity. In some embodiments, the resource block 500 is an updated version of the resource block 300 (FIG. 3) and the resource block 400 (FIG. 4). As the communication technology is further updated, the resource block 400 is modified by reserving an additional subset of OFDM symbols of slot 308b to allow transmission of data for predefined purposes, resulting in entire slot 308b being unavailable for general use. In some embodiments, for example, resource block 500 illustrates a resource block that may be used for an updated technology release and/or technology version (e.g., a third generation of UE). In some embodiments, the third generation or updated resource block 500 comprises a subset of reserved resource elements (e.g., OFDM symbols 520). The reserved resource elements are not available for general use. In some embodiments, the group of OFDM symbols 518a are available for general use and slot 308b is not available for general use.

In some embodiments, the resource map may comprise a series of resource blocks, each resource block may vary, resulting in a subset of OFDM symbols and a subset of slots available for general use. As the technology is further advanced, the resources available for general use may be reduced and reserved for specific uses (e.g., using the resource elements for reference signals).

Figure 6:
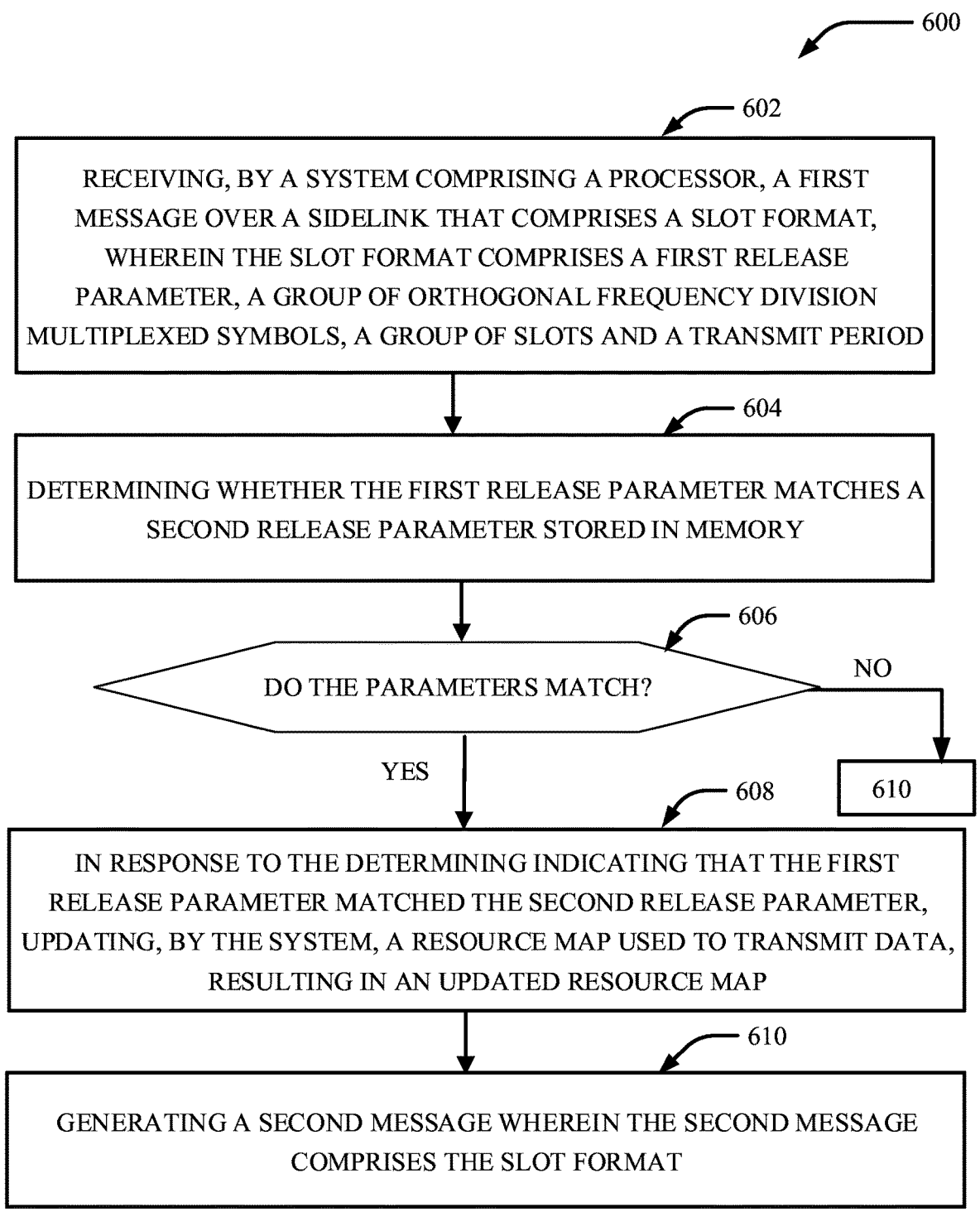
FIG. 6 illustrates an example, non-limiting computer implemented method that facilitates updating of a slot format used for establishing the NR sidelink in accordance with one or more embodiments described herein.

FIG. 6 depicts a diagram of an example, non-limiting computer implemented method that facilitates updating a slot format used for establishing the NR sidelink in accordance with one or more embodiments described herein. Repetitive description of like elements employed in other embodiments described herein is omitted for sake of brevity. In some examples, flow diagram 600 can be implemented by operating environment 1100 described below. It can be appreciated that the operations of flow diagram 600 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagram of FIG. 6.

Operation 602 depicts receiving, by a system comprising a processor, a first message over a sidelink that comprises a slot format, wherein the slot format comprises a first release parameter, a group of orthogonal frequency division multiplexed symbols, a group of slots and a transmit period (e.g., when a new technology is released, communication devices receive a broadcast message comprising slot format providing the new resource map). In some embodiments, the slot format comprises 1) release parameter that identifies technology release version (e.g., LTE Rel-8 through Rel-X) that requires an update to their resource block, the available subset of OFDM systems, available slots, and a transmit period (e.g., a time when the communication device needs to retransmit the slot format to other communication devices). In some embodiments, an offset is included in the slot format that can be used to delay the retransmission of slot format (e.g., for a coordinated transmission). Operation 604 depicts determining whether the first release parameter matches a second release parameter stored in memory (e.g., slot format is targeted for communication devices operating using one or more previous generation technology which can be identified by release and/or version parameter stored in memory). Operation 606 depicts determining if parameters match. If yes, then perform operation 608. Otherwise, perform operation 610. Operation 608 depicts in response to the determining indicating that the first release parameter matched the second release parameter, updating a resource map used to transmit data, resulting in an updated resource map. Operation 610 depicts generating a second message wherein the second message comprises the slot format. In some embodiments, the generated message can be transmitted at a specified time based on transmit periodicity provided in the slot format.

Figure 7:
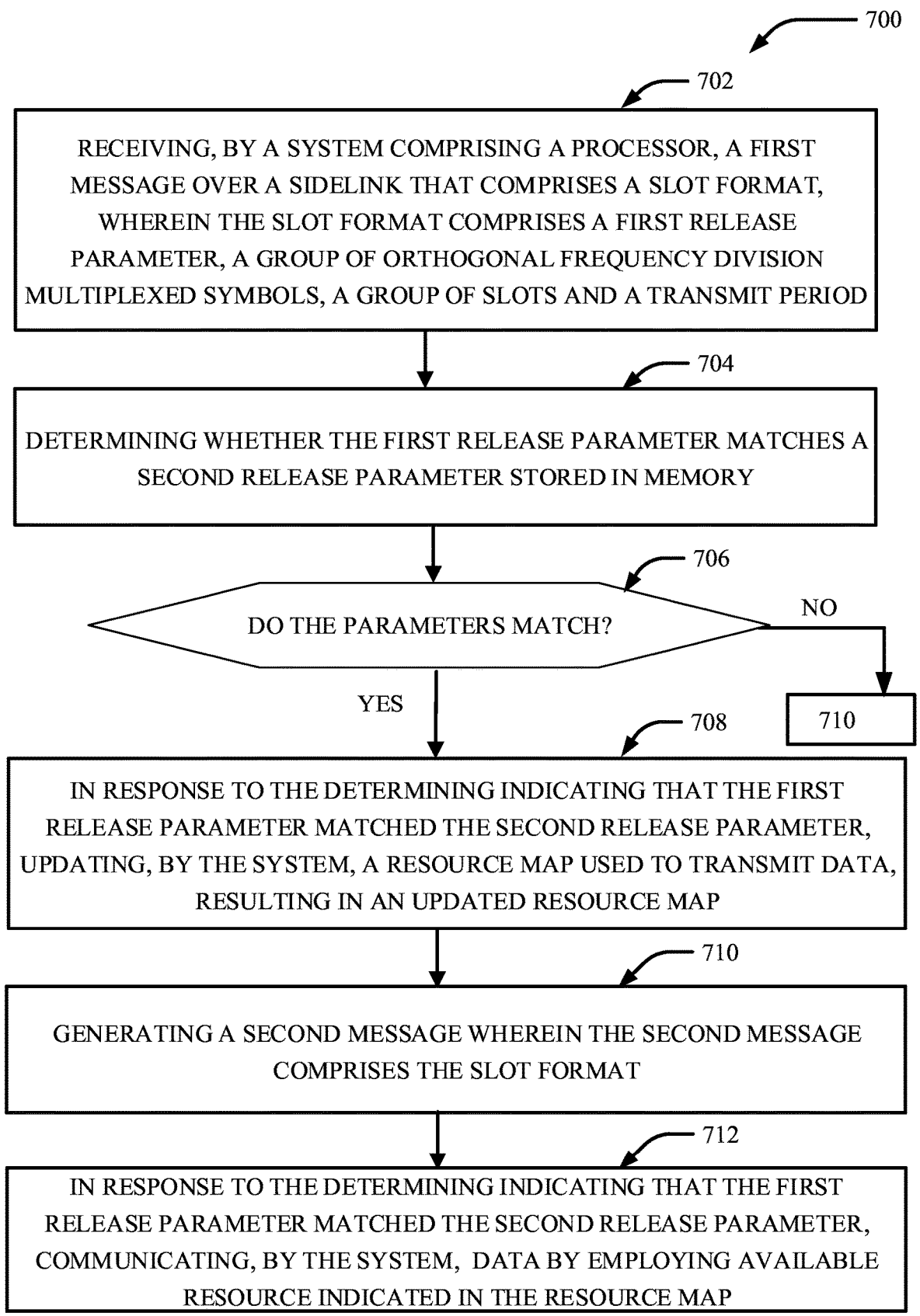
FIG. 7 illustrates an example, non-limiting computer implemented method that facilitates updating of a slot format used for establishing the NR sidelink in accordance with one or more embodiments described herein.

FIG. 7 depicts a diagram of an example, non-limiting computer implemented method that facilitates updating of slot format used for establishing the NR sidelink in accordance with one or more embodiments described herein. Repetitive description of like elements employed in other embodiments described herein is omitted for sake of brevity. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagram of FIG. 7.

Operation 702 depicts receiving, by a system comprising a processor, a first message over a sidelink that comprises a slot format, wherein the slot format comprises a first release parameter, a group of orthogonal frequency division multiplexed symbols, a group of slots and a transmit period (e.g., when a new technology is released, the communication devices receive a broadcast message comprising slot format providing the new resource map). Operation 704 depicts determining whether the first release parameter matches a second release parameter stored in memory (e.g., slot format is targeted for communication devices operating using one or more previous generation technology which can be identified by release and/or version parameter stored in memory). Operation 706 depicts determining if parameters match, and if yes then perform operation 708. Otherwise, perform operation 710. Operation 708 depicts in response to the determining indicating that the first release parameter matched the second release parameter, updating a resource map used to transmit data, resulting in an updated resource map. Operation 710 depicts generating a second message wherein the second message comprises the slot format. In some embodiments, the generated message can be transmitted at a specified time based on transmit periodicity provided in the slot format. Operation 712 depicts in response to the determining indicating that the first release parameter matched the second release parameter, communicating data by employing available resource indicated in the resource map.

Figure 8:
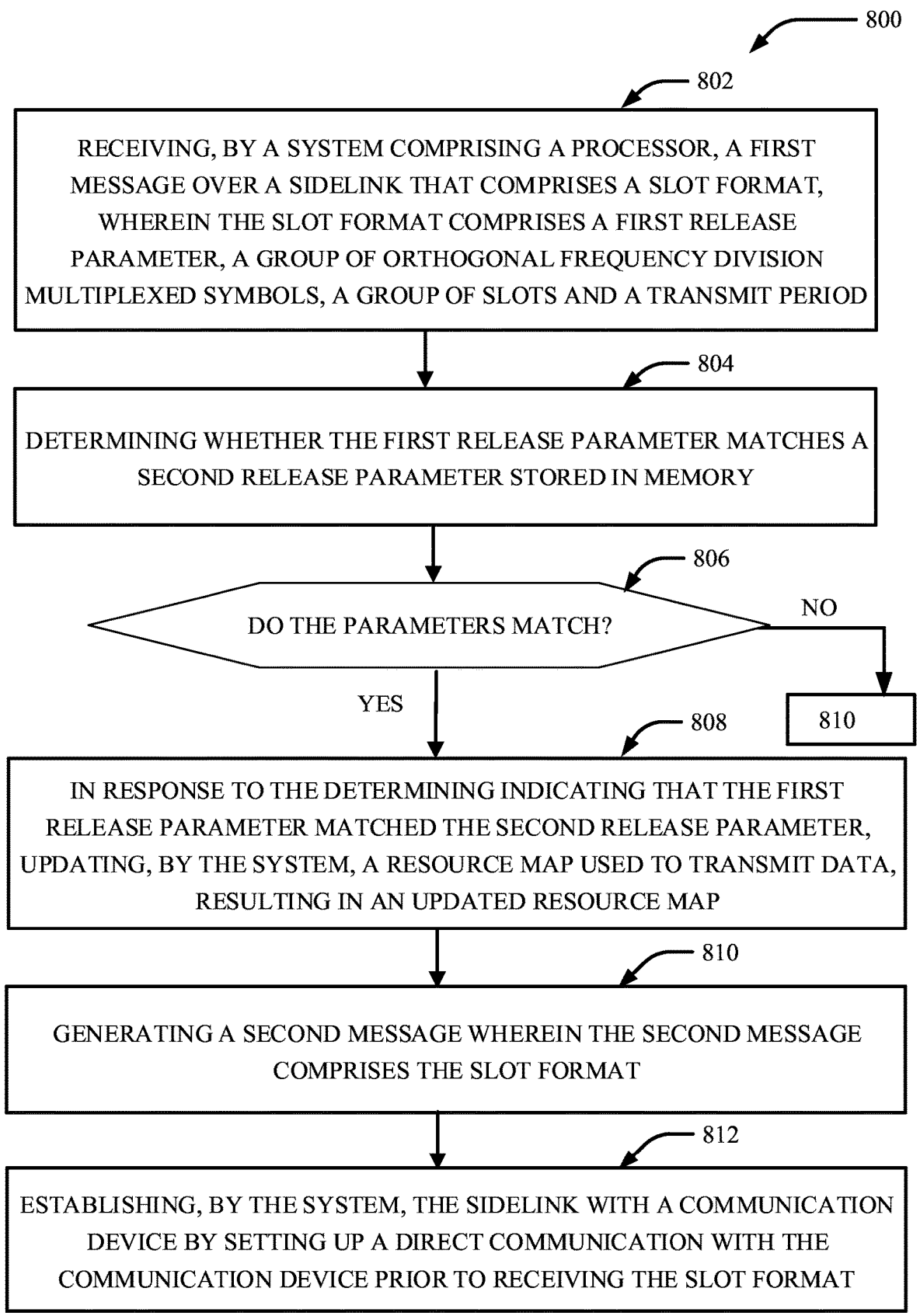
FIG. 8 illustrates an example, non-limiting computer implemented method that facilitates updating of a slot format used for establishing the NR sidelink in accordance with one or more embodiments described herein.

FIG. 8 depicts a diagram of an example, non-limiting computer implemented method that facilitates updating of slot format used for establishing the NR sidelink in accordance with one or more embodiments described herein. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagram of FIG. 8.

Operation 802 depicts receiving, by a system comprising a processor, a first message over a sidelink that comprises a slot format, wherein the slot format comprises a first release parameter, a group of orthogonal frequency division multiplexed symbols, a group of slots and a transmit period (e.g., when a new technology is released, the communication devices receive a broadcast message comprising slot format providing the new resource map). Operation 804 depicts determining whether the first release parameter matches a second release parameter stored in memory (e.g., slot format is targeted for communication devices operating using one or more previous generation technology which can be identified by release and/or version parameter stored in memory). Operation 806 depicts determining if parameters matched, then perform operation 808. Otherwise, perform operation 810. Operation 808 depicts in response to the determining indicating that the first release parameter matched the second release parameter, updating a resource map used to transmit data, resulting in an updated resource map. Operation 810 depicts generating a second message wherein the second message comprises the slot format. In some embodiments, the generated message can be transmitted at a specified time based on transmit periodicity provided in the slot format. Operation 812 depicts establishing the sidelink with a communication device by setting up a direct communication with the communication device prior to receiving the slot format.

Figure 9:
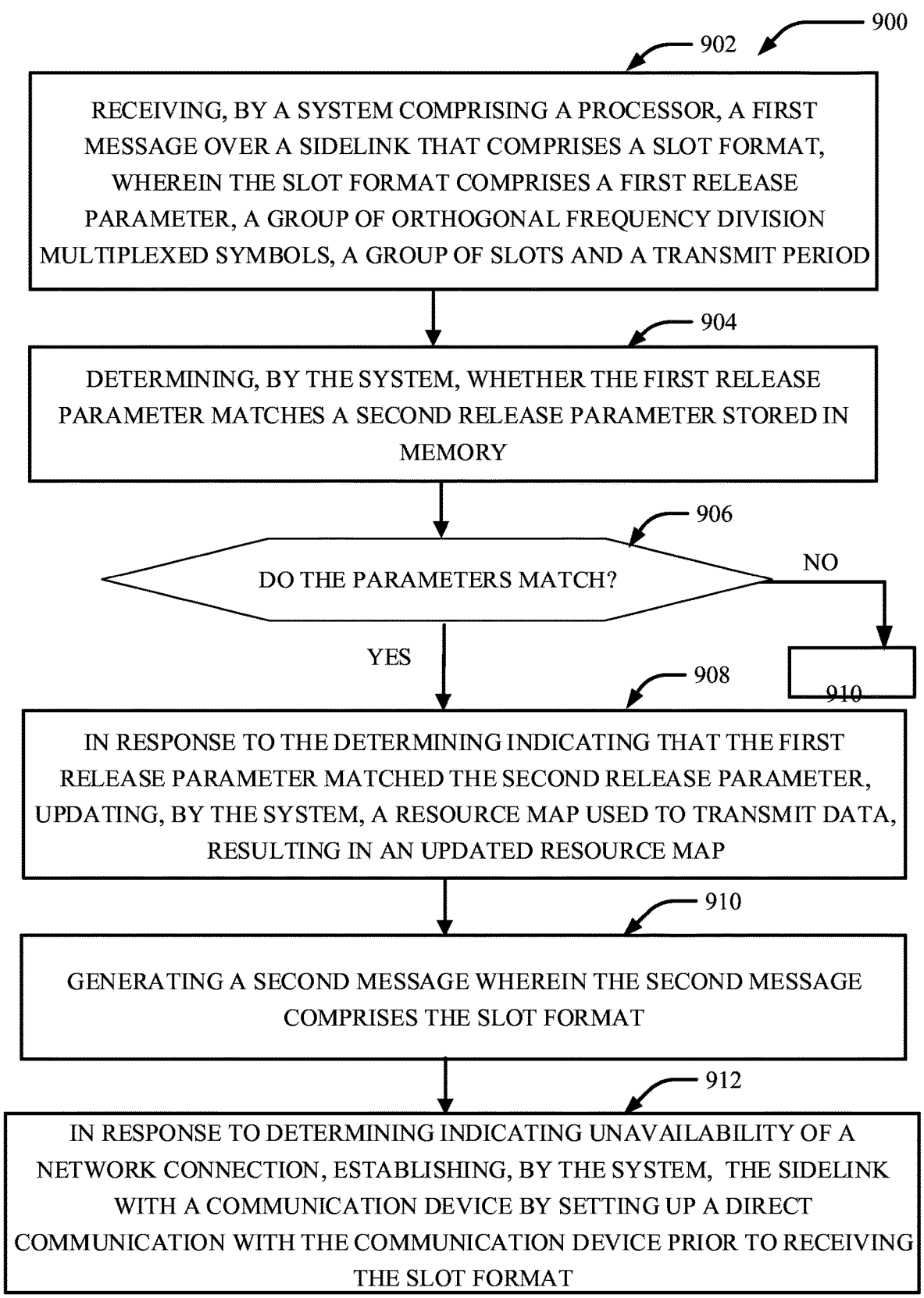
FIG. 9 illustrates an example, non-limiting computer implemented method that facilitates updating of a slot format used for establishing the NR sidelink in accordance with one or more embodiments described herein.

FIG. 9 depicts a diagram of an example, non-limiting computer implemented method that facilitates updating of slot format used for establishing the NR sidelink in accordance with one or more embodiments described herein. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagram of FIG. 9.

Operation 902 depicts receiving, by a system comprising a processor, a first message over a sidelink that comprises a slot format, wherein the slot format comprises a first release parameter, a group of orthogonal frequency division multiplexed symbols, a group of slots and a transmit period (e.g., when a new technology is released, the communication devices receive a broadcast message comprising slot format providing the new resource map). Operation 904 depicts determining whether the first release parameter matches a second release parameter stored in memory (e.g., slot format is targeted for communication devices operating using one or more previous generation technology which can be identified by release and/or version parameter stored in memory). Operation 906 depicts determining if parameters match, and if yes, then perform operation 908. Otherwise, perform operation 910. Operation 908 depicts in response to the determining indicating that the first release parameter matched the second release parameter, updating a resource map used to transmit data, resulting in an updated resource map. Operation 910 depicts generating a second message wherein the second message comprises the slot format. In some embodiments, the generated message can be transmitted at a specified time based on transmit periodicity provided in the slot format. Operation 912 depicts in response to determining indicating unavailability of a network connection, establishing the sidelink with a communication device by setting up a direct communication with the communication device prior to receiving the slot format.

Figure 10:
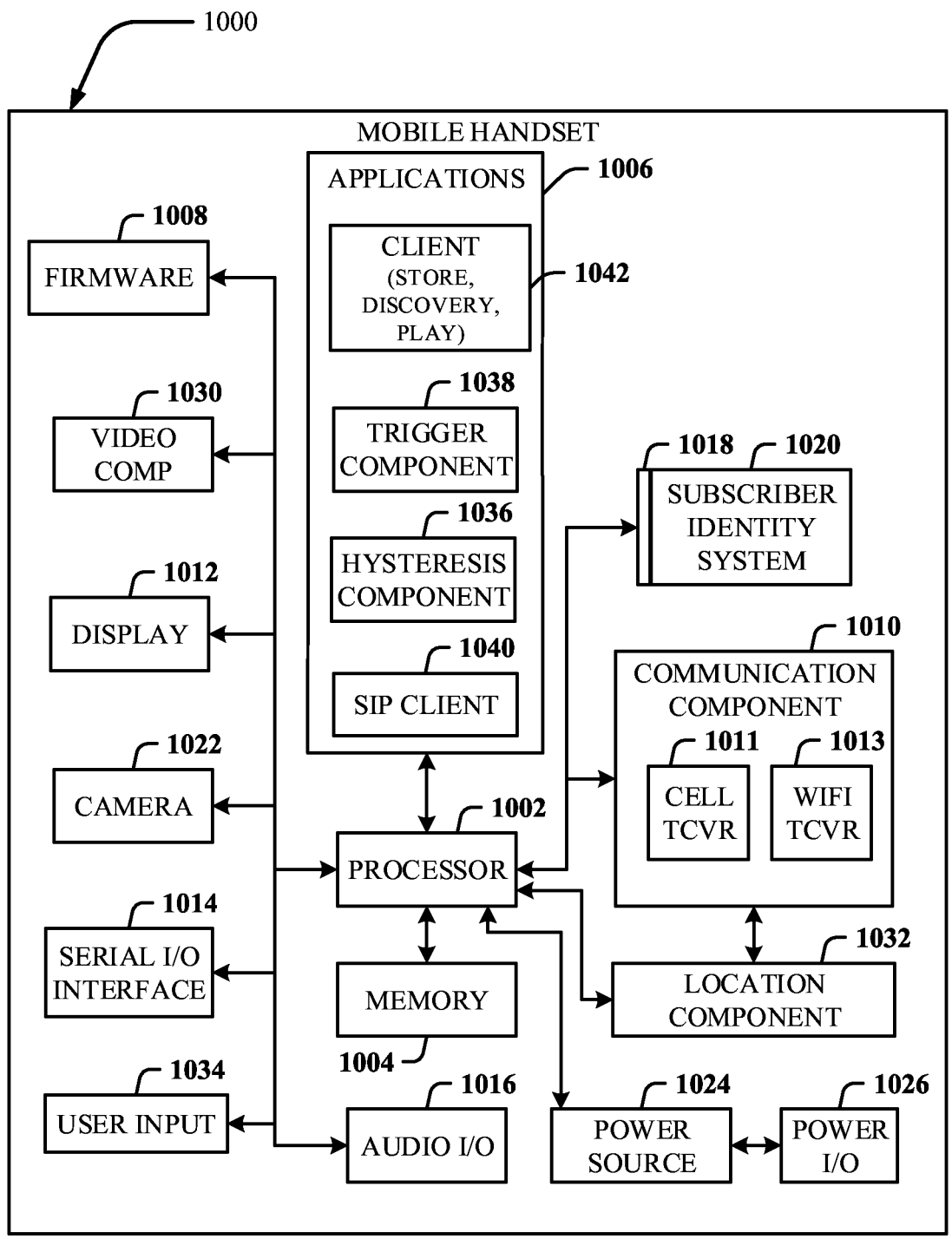
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008 and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020 and interfacing the SIM card 1020 with the processor 1002. However, it is to be appreciated that the SIM card 1020 can be manufactured into the handset 1000 and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VOIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
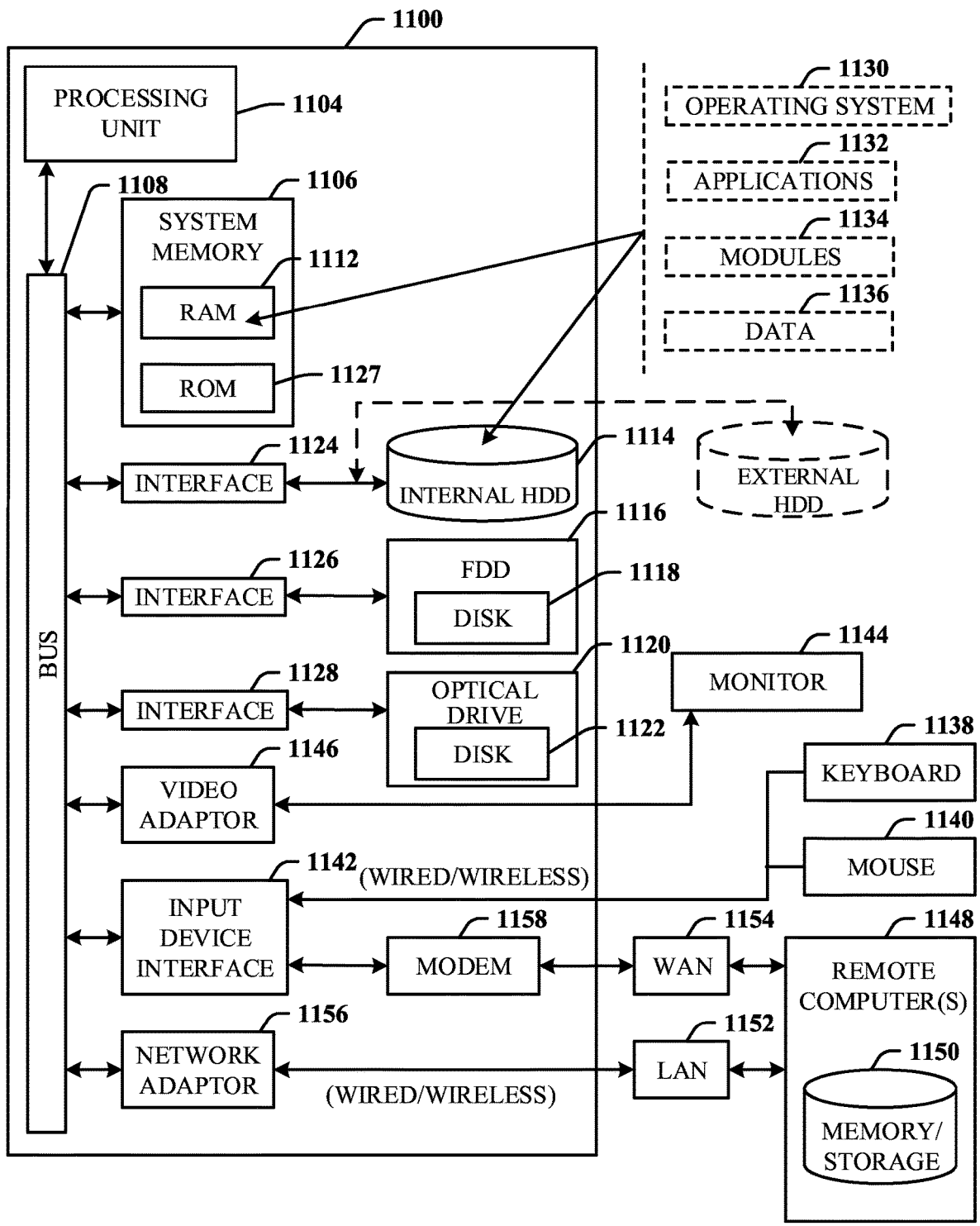
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touchscreen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at a 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration.

Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment." "mobile station," "mobile," subscriber station." "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)." "Base Station (BS)." BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber." "customer entity." "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A user equipment, comprising:
a processor; and
a memory that stores executable instructions that, when executed by the processor, facilitate performance of operations, comprising:
receiving a slot format comprising a group of orthogonal frequency division multiplexed symbols that are able to be used for sidelink communications;
receiving first equipment version information associated with the slot format;
determining whether the first equipment version information matches second equipment version information associated with the user equipment;
in response to the first equipment version information being determined to match the second equipment version information, using the slot format to update a resource map used to transmit sidelink communication data, resulting in an updated resource map; and
broadcasting the slot format, wherein broadcasting the slot format is performed according to a previous slot format applied by the user equipment before receiving the slot format.

2. The user equipment of claim 1, wherein the operations further comprise using the updated resource map to transmit the sidelink communication data.

3. The user equipment of claim 1, wherein the broadcasting the slot format comprises broadcasting the slot format using the updated resource map.

4. The user equipment of claim 3, wherein broadcasting the slot format comprises broadcasting the slot format using the resource map.

5. The user equipment of claim 3, wherein the broadcasting is performed at a specified time based on information received with the slot format.

6. The user equipment of claim 1, wherein the slot format is received via a sidelink.

7. The user equipment of claim 1, wherein the slot format is received from a network node.

8. A method, comprising:
receiving, by a system comprising a processor, a message comprising a slot format and first equipment version information, wherein the slot format comprises a group of slots that are able to be used for sidelink communications;
determining, by the system, whether the first equipment version information matches second equipment version information stored in a memory;
in response to the first equipment version information being determined to match the second equipment version information, using, by the system, the slot format to update a resource map used to transmit sidelink communication data, resulting in an updated resource map; and
broadcasting, by the system, the slot format, wherein broadcasting the slot format is performed according to a previous slot format applied before receiving the slot format.

9. The method of claim 8, further comprising using, by the system, the updated resource map to transmit the sidelink communication data.

10. The method of claim 9, wherein using the updated resource map to transmit the sidelink communication data comprises employing available resource elements indicated in the updated resource map.

11. The method of claim 8, wherein the broadcasting the slot format comprises broadcasting the slot format using the resource map.

12. The method of claim 8, wherein receiving the message comprising the slot format comprises receiving the message via a sidelink.

13. The method of claim 8, wherein the message is configured according to a previous slot format used by the system previous to receiving the message comprising the slot format.

14. The method of claim 8, further comprising facilitating, by the system, establishing a sidelink with a communication device comprising establishing a direct communication with the communication device prior to receiving the message.

15. The method of claim 8, wherein the slot format further comprises a group of orthogonal frequency division multiplexed symbols.

16. A non-transitory machine-readable medium, comprising executable instructions that, when executed by a processor at a first user equipment, facilitate performance of operations, comprising:

receiving an updated slot format via a direct sidelink connection with a second user equipment, wherein the updated slot format is different than a current slot format;

receiving first equipment version information associated with the updated slot format;

determining whether the first equipment version information is same as second equipment version information associated with the first user equipment; and in response to the first equipment version information being determined to be the same as the second equipment version information, using the updated slot format to update a resource map used to transmit sidelink communication data, resulting in an updated resource map.

17. The non-transitory machine-readable medium of claim 16, wherein the operations further comprise using the updated resource map to transmit the sidelink communication data.

18. The non-transitory machine-readable medium of claim 16, wherein the operations further comprise broadcasting the updated slot format.

19. The non-transitory machine-readable medium of claim 18, wherein the rebroadcasting is performed at a specified time based on information received with the updated slot format.

20. The non-transitory machine-readable medium of claim 16, wherein the updated slot format comprises at least one of:

a group of slots that are able to be used for sidelink communications, or a group of orthogonal frequency division multiplexed symbols that are able to be used to transmit the sidelink communication data.

* * * * *

UNITED STATES PATENT AND TRADEMARK OFFICE
CERTIFICATE OF CORRECTION

| | | |
|---|---|---|
| PATENT NO. | : 12,096,413 B2 | Page 1 of 1 |
| APPLICATION NO. | : 18/045661 | |
| DATED | : September 17, 2024 | |
| INVENTOR(S) | : Xiaoyi Wang et al. | |

It is certified that error appears in the above-identified patent and that said Letters Patent is hereby corrected as shown below:

In the Claims

Column 28, Line 9, Claim 19, --rebroadcasting-- should be replaced with "broadcasting".

Signed and Sealed this
Tenth Day of December, 2024

Katherine Kelly Vidal
*Director of the United States Patent and Trademark Office*